(12) United States Patent  (10) Patent No.: US 9,141,133 B2
Murayama  (45) Date of Patent: Sep. 22, 2015

(54) INFORMATION PROCESSING APPARATUS AND DISPLAY SCREEN OPERATING METHOD FOR SCROLLING

(75) Inventor: Hiroki Murayama, Nagano (JP)

(73) Assignee: Sony Corporation (JP)

( * ) Notice: Subject to any disclaimer, the term of this patent is extended or adjusted under 35 U.S.C. 154(b) by 416 days.

(21) Appl. No.: 13/066,363

(22) Filed: Apr. 13, 2011

(65) Prior Publication Data

US 2011/0267753 A1  Nov. 3, 2011

(30) Foreign Application Priority Data

Apr. 30, 2010 (JP) ................................ P2010-105003

(51) Int. Cl.
G06F 1/16 (2006.01)
(52) U.S. Cl.
CPC ...... *G06F 1/1616* (2013.01); *G06F 2200/1614* (2013.01); *G06F 2200/1637* (2013.01)
(58) Field of Classification Search
CPC ........................... G06K 9/22; H04M 1/274525
See application file for complete search history.

(56) References Cited

U.S. PATENT DOCUMENTS

| 6,624,824 | B1 * | 9/2003 | Tognazzini et al. ........... 345/684 |
| 2003/0210255 | A1 | 11/2003 | Hiraki |
| 2004/0125073 | A1 | 7/2004 | Potter et al. |
| 2004/0212602 | A1 | 10/2004 | Nako et al. |
| 2007/0234779 | A1 * | 10/2007 | Hsu et al. ........................ 73/1.79 |
| 2008/0235965 | A1 * | 10/2008 | Jaiswal et al. ............. 33/366.11 |
| 2009/0160778 | A1 * | 6/2009 | Nurmi et al. .................. 345/173 |
| 2009/0213081 | A1 * | 8/2009 | Case, Jr. ......................... 345/173 |
| 2009/0303204 | A1 | 12/2009 | Nasiri et al. |
| 2010/0196096 | A1 * | 8/2010 | Halonen et al. .............. 404/84.1 |

FOREIGN PATENT DOCUMENTS

| EP | 0805389 A2 | 11/1997 |
| EP | 1696301 A1 | 8/2006 |
| EP | 1783591 A1 | 5/2007 |
| GB | 2336747 A | 10/1999 |
| JP | 2003-280785 A | 10/2003 |
| JP | 2004-102738 A | 4/2004 |
| WO | 0127727 A2 | 4/2001 |

OTHER PUBLICATIONS

Oakley, Ian, et al. "Tilt and feel: Scrolling with vibrotactile display." EuroHaptics 2004 (2004): 316-323.*
European Search Report EP 11161265, dated Aug. 4, 2011.

* cited by examiner

*Primary Examiner* — Zhengxi Liu
(74) *Attorney, Agent, or Firm* — Lerner, David, Littenberg, Krumholz & Mentlik, LLP

(57) ABSTRACT

A computer device is provided that may comprise a display portion, a reference position input for enabling setting of a reference tilt position which is representative of an initial tilt position of the computer device. The computer device may also comprise a processor configured to perform a predetermined operation in accordance with a change in a tilt position of the computer device from the reference tilt position to a current tilt position.

11 Claims, 8 Drawing Sheets

INFORMATION PROCESSING APPARATUS AND DISPLAY SCREEN OPERATING METHOD FOR SCROLLING

CROSS-REFERENCE TO RELATED APPLICATION

The present application claims priority from Japanese Patent Application No. JP 2010-105003 filed in the Japanese Patent Office on Apr. 30, 2010, the entire content of which is incorporated herein by reference.

BACKGROUND

1. Technical Field

The present application relates to an information processing apparatus and a display screen operating method. In particular, the present application relates to a handheld information processing apparatus capable of allowing the user to perform various operations, and also relates to a method for operating a display screen of the handheld information processing apparatus.

2. Description of the Related Art

Various personal computers with a wide variety of functions have been developed and proposed. In recent years, for example, notebook personal computers (hereinafter referred to as notebook PCs) have become smaller and smaller. There have been proposed notebook PCs that can be operated while being held in user's hands.

Besides the notebook PCs, electronic devices with various information processing functions have been proposed which can be used while being held in user's hands. Additionally, various techniques have been proposed to improve their usability (see, e.g., Japanese Unexamined Patent Application Publication No. 2004-102738).

Japanese Unexamined Patent Application Publication No. 2004-102738 describes a display apparatus which is operated while being held in user's hands. The display apparatus is equipped with an acceleration sensor and an angular velocity sensor, which detect movement of a display unit of the display apparatus in a planar direction. On the basis of the result of the detection made by the sensors, a screen displayed on the display unit is scrolled.

SUMMARY

As described above, various techniques for operating handheld electronic devices have been proposed. However, as for techniques for operating handheld information processing apparatuses, such as notebook PCs, which allow the user to perform various operations, no technique has yet been proposed which is fully satisfactory in terms of usability. It is thus necessary to achieve further improvement in usability.

The present application has been made in view of the circumstances described above. It is desirable to improve usability of a handheld information processing apparatus capable of allowing the user to perform various operations.

According to the embodiment of the present application, a handheld information processing apparatus with improved usability can be provided which allows the user to perform various operations.

In accordance with another embodiment of the present application, a computer device is provided. The computer device may comprise a display portion, a reference position input for enabling setting of a reference tilt position which is representative of an initial tilt position of the computer device, and a processor configured to perform a predetermined operation in accordance with a change in a tilt position of the computer device from the reference tilt position to a current tilt position.

In accordance with a further embodiment of the present application, a method for use with a portable computer device is provided. The method may comprise activating a reference position input that enables setting of a reference tilt position which is representative of an initial tilt position of the portable computer device, and performing a predetermined operation which is related to a change in a tilt position of the computer device from the reference tilt position to a current tilt position.

DETAILED DESCRIPTION

An information processing apparatus and a display screen operating method according to an embodiment of the present invention will be described with reference to the drawings in the following order. Note that the configuration of the present invention is not limited to this.

1. Basic configuration of information processing apparatus
2. Various operations on information processing apparatus
3. Scrolling operation on information processing apparatus 1. Basic Configuration of Information Processing Apparatus
(External Configuration of Information Processing Apparatus)

Figure 1:
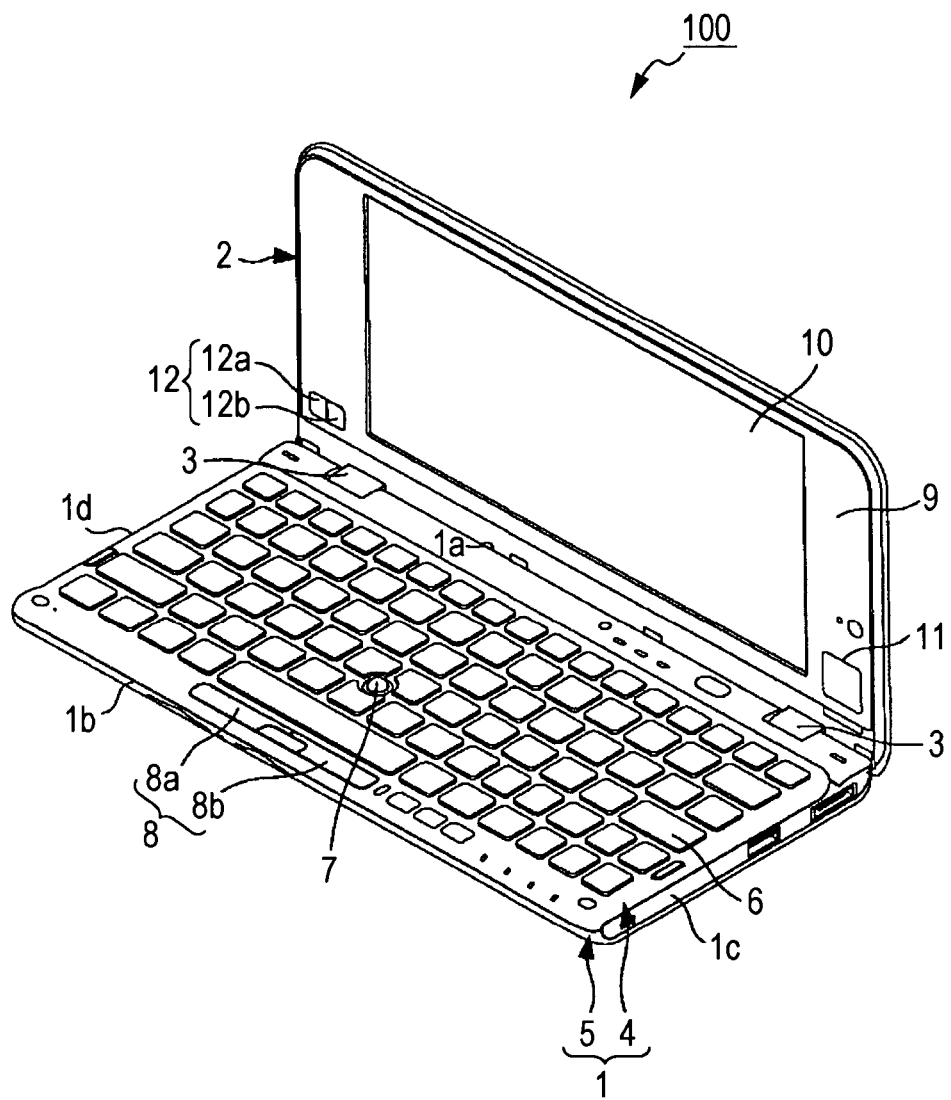
FIG. 1 is an external perspective view of an information processing apparatus according to an embodiment of the present application.

FIG. 1 is an external perspective view of an information processing apparatus 100 according to an embodiment of the present application. In the present embodiment, a notebook PC will be described as an example of the information processing apparatus 100.

The information processing apparatus 100 includes a main body 1 (apparatus main body), a display unit 2, and two hinges 3. In the example illustrated in FIG. 1, the two hinges 3 are attached near respective ends of a long edge 1a of the main body 1 adjacent to the display unit 2. The display unit 2 is attached to the main body 1 via the two hinges 3. Specifically, the display unit 2 is attached to the main body 1 such that it can pivot about a line connecting the centers of the two hinges 3. The display unit 2 is opened and closed relative to the main body 1 by pivoting of the display unit 2.

The main body 1 includes a palm rest unit 4 (keyboard unit) and a main body unit 5 that constitute an upper side (facing the display unit 2) and a bottom side, respectively, of the main body 1. The palm rest unit 4 and the main body unit 5 are integrally combined to form the main body 1. The palm rest unit 4 and the main body unit 5 each are composed of a plurality of members, but have no visible screws etc. on their exteriors.

The palm rest unit 4 includes operators, such as a keyboard 6, a stick pointer 7, and a first click button 8. The stick pointer 7 is an operator used to move a cursor (pointer) displayed on a display screen 10 (described below) and to scroll the display screen 10. The stick pointer 7 is located near the center of the palm rest unit 4.

The first click button 8 includes a left click button 8a and a right click button 8b. The first click button 8 is located at substantially the center of a long edge 1b of the palm rest unit 4 opposite the long edge 1a to which the hinges 3 are attached. The left click button 8a and the right click button 8b correspond to, for example, a left click button and a right click button, respectively, of a mouse used with a desktop PC in related art.

Although not shown in FIG. 1, the main body unit 5 is equipped with, for example, a printed circuit board having a plurality of electronic components mounted thereon, a heat sink unit, and a drive such as a hard disk drive. The printed circuit board has, for example, a central processing unit (CPU), a memory, and other electronic components mounted thereon.

Although not shown in FIG. 1, the main body unit 5 is equipped with an acceleration sensor that is used for various operation functions (described below). The acceleration sensor can be disposed at any position. For example, the acceleration sensor may be provided in the display unit 2. If the acceleration sensor is provided in the main body unit 5, the acceleration sensor is positioned by considering the positional relationship with other electronic components to be mounted on the main body unit 5. In the present embodiment, the acceleration sensor is disposed, for example, substantially under the key for the letter "R".

The display unit 2 includes a housing 9, a display screen 10 disposed on a surface of the housing 9 facing the main body 1, a touch pad 11, a second click button 12 (starting operator), and a display processing unit (not shown) provided inside the housing 9 and performing predetermined display processing.

The display screen 10 is a screen for displaying various types of information, such as text and images. The touch pad 11 is an operator used, for example, to move a cursor (pointer) displayed on the display screen 10 and to scroll the display screen 10. In the present embodiment, a capacitive sensor is used as the touch pad 11. The touch pad is disposed near one corner of the housing 9 adjacent to the main body 1 (near a lower-right corner of the housing 9 in FIG. 1).

The second click button 12 includes a left click button 12a and a right click button 12b. The second click button 12 is disposed near the other corner of the housing 9 adjacent to the main body 1 (near a lower-left corner of the housing 9 in FIG. 1). The left click button 12a and the right click button 12b correspond to, for example, a left click button and a right click button, respectively, of a mouse used with a desktop PC in related art.

As described above, in the present embodiment, the touch pad 11 and the second click button 12 are disposed near the lower-right corner and the lower-left corner, respectively, of the housing 9 of the display unit 2 in FIG. 1. This is because of the following reasons. As will be described below, a pointing device system including the touch pad 11 and the second click button 12 of the display unit 2 is mainly used while the user holds both short edges 1c and 1b of the main body 1 of the information processing apparatus 100 with both hands. Therefore, when the touch pad 11 and the second click button 12 are disposed as described above, the user can easily operate them with thumbs while holding both the short edges 1c and 1d of the main body 1. The positions of the touch pad 11 and the second click button 12 are not limited to those described above. The touch pad 11 and the second click button 12 may be disposed at any positions which allow the user to operate them with thumbs etc. while holding both the short edges 1c and 1d of the main body 1.

The information processing apparatus 100 has a pointing device system including the stick pointer 7 and the first click button 8 of the main body 1, and another pointing device system including the touch pad 11 and the second click button 12 of the display unit 2 as described above. This means that the information processing apparatus 100 of the present embodiment has two pointing device systems. In the present embodiment, the two pointing device systems may be electrically connected to each other (by sharing a common processing system) so that they can be used simultaneously, or may have different processing systems so that they can be operated individually.

(Internal Configuration of Information Processing Apparatus)

Figure 2:
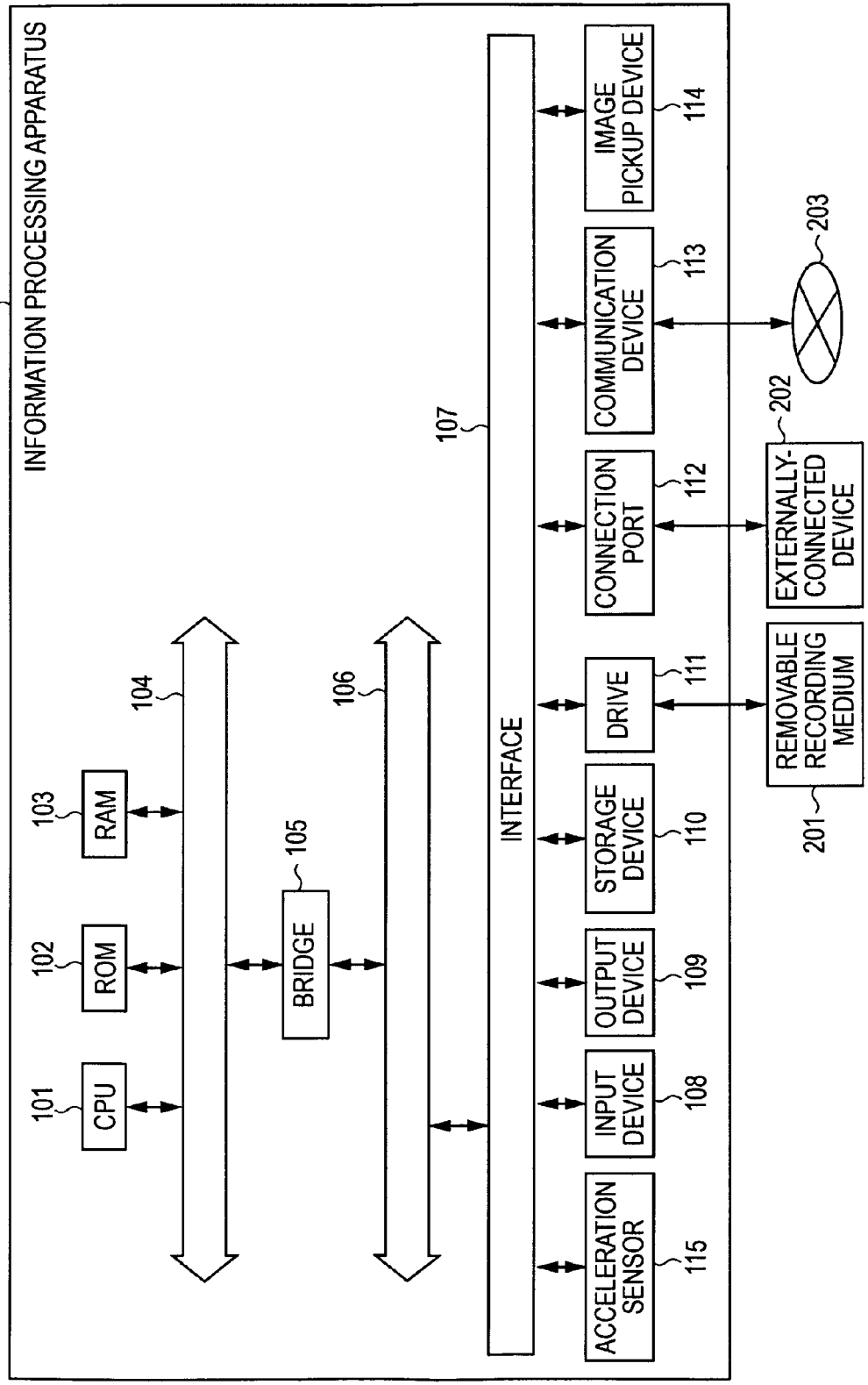
FIG. 2 is an internal block diagram of the information processing apparatus.

An internal configuration (hardware configuration) of the information processing apparatus 100 will now be described with reference to FIG. 2. FIG. 2 is a block diagram illustrating hardware of the information processing apparatus 100.

The information processing apparatus 100 includes a CPU 101, a read only memory (ROM) 102, a random access memory (RAM) 103, a host bus 104, a bridge 105, an external bus 106, and an interface 107. The information processing apparatus 100 further includes an input device 108, an output device 109, a storage device 110, a drive 111, a connection port 112, a communication device 113, an image pickup device 114, and an acceleration sensor 115.

The CPU 101 serves both as an arithmetic processing device and a control device. Specifically, the CPU 101 controls all or some of operations within the information processing apparatus 100 in accordance with various programs recorded in the ROM 102, the RAM 103, and the storage device 110, or in a removable recording medium 201 connected to the information processing apparatus 100 via the drive 111. Therefore, the CPU 101 controls various operations (described below) in the information processing apparatus 100 of the present embodiment.

The ROM 102 stores programs and arithmetic parameters used by the CPU 101. The RAM 103 temporarily stores programs that the CPU 101 uses to perform control processing, and parameters necessary for execution of the control processing.

The CPU 101, the ROM 102, and the RAM 103 are connected to each other via the host bus 104, which includes an internal bus (not shown) such as a CPU bus. Data, such as the programs and arithmetic parameters described above, is input and output via the host bus 104 between the CPU 101, the ROM 102, and the RAM 103. The host bus 104 is connected via the bridge 105 to the external bus 106, such as a peripheral component interconnect/interface (PCI) bus.

The input device 108 includes operation units, such as a mouse, a keyboard, a touch panel, buttons, switches, and levers, operated by the user. This means that the stick pointer 7 and the first click button 8 of the main body 1 and the touch pad 11 and the second click button 12 of the display unit 2, described above, are included in the input device 108. The input device 108 may include a remote control device using infrared rays or radio waves. The input device 108 may have an input function which allows direct operation from an externally-connected device 202, such as a mobile phone or a personal digital assistant (PDA).

The input device 108 includes an input control circuit that generates an operation signal corresponding to an operation performed by the user using the various operation units described above, and outputs the generated operation signal to the CPU 101. On the basis of the operation signal output from the input device 108, the CPU 101 executes processing corresponding to the operation performed by the user.

The output device 109 includes a display device capable of visually informing the user of obtained information, and an audio output device capable of informing the user of obtained information with sound. The display device may be, for example, a cathode-ray tube (CRT) display device, a liquid-crystal display device, a plasma display device, an electro-luminescence (EL) display device, or a lamp. The audio output device includes, for example, a speaker and headphones. The output device 109 may include a printer, a mobile phone, and a facsimile.

The output device 109 outputs results obtained by various types of processing performed by the information processing apparatus 100. Specifically, a display device included in the output device 109 displays results obtained by various types of processing performed by the information processing apparatus 100 as text or images. An audio output device included in the output device 109 converts an audio signal composed of reproduced voice data and acoustic data into an analog signal and outputs it.

The storage device 110 is a device for storage of data. The storage device 110 may be, for example, a magnetic storage device such as a hard disk drive (HDD), a semiconductor storage device, an optical storage device, or a magneto-optical storage device. The storage device 110 stores programs executed by the CPU 101, various types of data, and acoustic signal data and image signal data externally obtained.

The drive 111 is a reader/writer for recording media. Although the drive 111 is included in the information processing apparatus 100 in the example of FIG. 2, the present application is not limited to this. The drive 111 may be configured as a drive external to the information processing apparatus 100. The drive 111 reads predetermined information recorded in the removable recording medium 201 loaded in the drive 111 and outputs the read predetermined information to the RAM 103. Also, the drive 111 is capable of writing information to the removable recording medium 201 loaded therein.

The removable recording medium 201 is, for example, a magnetic disk, an optical disk, a magneto-optical disk, or a semiconductor memory. More specifically, the removable recording medium 201 is, for example, a digital versatile disc (DVD), a Blu-ray disc (BD) (registered trademark), a compact flash (registered trademark) card, a memory stick, or a secure digital (SD) memory card. The removable recording medium 201 may be, for example, an integrated circuit (IC) card equipped with a contactless IC chip, or an external electronic device.

The connection port 112 is for directly connecting an external device to the information processing apparatus 100. The connection port 112 includes, for example, a universal serial bus (USB) port, an IEEE1394 port such as i.Link, and a small computer system interface (SCSI) port. The connection port 112 further includes, for example, an RS-232C port, an optical audio terminal, and a high-definition multimedia interface (HDMI) port. By connecting the externally-connected device 202 to the connection port 112, the information processing apparatus 100 can directly obtain acoustic signal data and image signal data from the externally-connected device 202, and can provide acoustic signal data and image signal data to the externally-connected device 202.

The communication device 113 is a communication interface including devices necessary for connecting the information processing apparatus 100 to, for example, a network 203. The communication device 113 includes, for example, a communication card for a wired or wireless local area network (LAN), Bluetooth, or wireless USB (WUSB). The communication device 113 further includes an optical communication router, an asymmetric digital subscriber line (ADSL) router, or various communication modems. The information processing apparatus 100 can transmit and receive predetermined information to and from, for example, the Internet or communication devices via the communication device 113. The network 203 is a network connected to the communication device 113 by wired or wireless communication. For example, the network 203 is the Internet, a home LAN, an infrared communication network, a radio-wave communication network, or a satellite communication network.

The image pickup device 114 includes an imaging optical system and an image pickup element (not shown). The imaging optical system receives light (image light) incident from a subject and forms the incident light into an image on the image pickup element. The image pickup element converts the amount of the incident light into an electric signal (photoelectric conversion) to obtain a picked-up image. The picked-up image obtained from the image pickup element may be a moving image obtained in time series or a still image obtained at one point in time. The image pickup element is, for example, a charge coupled device (CCD) image sensor or a metal-oxide semiconductor (MOS) image sensor.

The acceleration sensor 115 detects information related to a tilt of the main body 1 (acceleration). In the information processing apparatus 100 of the present embodiment, the CPU 101 may perform one or more predetermined operations, such as a scrolling operation for scrolling the display screen 10, a rotating operation for rotating a displayed image, a cursor operation for moving a cursor displayed on the display screen, an audio/visual operation for reproducing audio/visual content, and/or a page turning operation for turning a displayed page, on the basis of the information detected by the acceleration sensor 115.

In the present embodiment, a three-axis acceleration sensor serves as the acceleration sensor 115 to handle the various operations described above. In the present embodiment, a tilt of the main body 1 is calculated on the basis of an acceleration (gravitational acceleration) component in each axis direction detected by the acceleration sensor 115. In the present embodiment, the various operations described above are handled by one acceleration sensor 115. However, the present application is not limited to this, and a different acceleration sensor may be provided for each of the operations. In this case, a one-axis or two-axis acceleration sensor may be used depending on the type of operation.

The above-described internal configuration (hardware configuration) of the information processing apparatus 100 is merely an example. Each of the components described above may either be a general-purpose member, or hardware designed specifically for a function corresponding to the component. The hardware configuration to be used can be changed appropriately depending on the level of technology of the time when the present embodiment is carried out.

2. Various Operations on Information Processing Apparatus

Examples of various operations that can be performed on the information processing apparatus 100 of the present embodiment will now be briefly described.

As described above, the information processing apparatus 100 of the present embodiment has two pointing device systems. The stick pointer 7 and the first click button 8 of the main body 1 are used, for example, to perform a click operation, a cursor operation, and a scrolling operation on the information processing apparatus 100 placed on a desk, as in the case of a notebook PC of related art. Also, in the information processing apparatus 100 of the present embodiment, the touch pad 11 and the second click button 12 of the display unit 2 allow the user, for example, to perform a click operation, a cursor operation, and a scrolling operation while holding the information processing apparatus 100 in hands.

Operations performed using the stick pointer 7 and the first click button 8 of the main body 1 will not be described here, as they are substantially the same as those performed on a notebook PC of related art. A description will be given of operations that can be performed using the touch pad 11 and the second click button 12 of the display unit 2.

Figure 3:
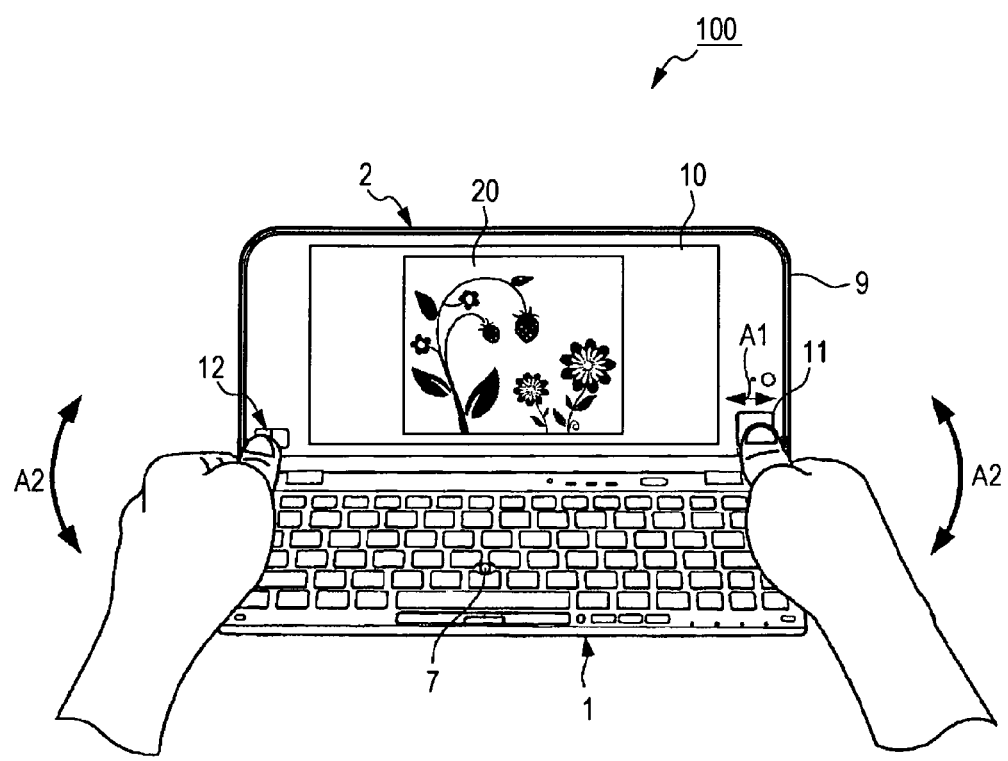
FIG. 3 is a diagram for explaining various operations performed on the information processing apparatus.

FIG. 3 illustrates the information processing apparatus 100 that is held at one and the other short edges of the main body 1 (on the right and left sides in FIG. 3) by the user's right and left hands, respectively (hereinafter, this position of the information processing apparatus 100 will be referred to as "landscape position"). In the information processing apparatus 100 of the present embodiment, in FIG. 3, the touch pad 11 is located near the lower-right corner of the display unit 2, and the second click button 12 is located near the lower-left corner of the display unit 2. When the user holds the information processing apparatus 100 in landscape position, the user's right thumb is placed on the touch pad 11 and the user's left thumb is placed on the second click button 12. Therefore, when the user holds the information processing apparatus 100 of the present embodiment in landscape position, the user can easily operate the touch pad 11 and the second click button 12 while holding the information processing apparatus 100.

In the present embodiment, while holding the information processing apparatus 100 in landscape position, the user can may perform one or more predetermined operations, such as a scrolling operation for scrolling the display screen 10, a cursor operation for moving a cursor on the display screen 10, a page turning operation for turning a displayed page, an audio/visual operation for reproducing audio/visual content, and/or a rotating operation for rotating a displayed image. Hereinafter, a brief description will be given of a page turning operation for turning a displayed page and a rotating operation for rotating a displayed image that are performed on the information processing apparatus 100 of the present embodiment. A scrolling process in the information processing apparatus 100 of the present embodiment will be described in detail later on.

(Page Turning Operation for Turning Displayed Page)

In the information processing apparatus 100 of the present embodiment, a page turning operation for turning a displayed page can be performed using the touch pad 11 or the acceleration sensor 115.

When using the touch pad 11, the user moves the right thumb on the touch pad 11 along the longitudinal direction of the display screen 10 (in the direction of arrow A1 in FIG. 3) while holding the information processing apparatus 100 in landscape position (see FIG. 3). Thus, a page turning operation for turning a displayed page can be done.

When the acceleration sensor 115 is used, a page turning operation for turning a displayed page is done in the following manner. First, as illustrated in FIG. 3, the user holds the information processing apparatus 100 in landscape position. Next, as indicated by arrow A2 in FIG. 3, the user rotates the information processing apparatus 100 to the right or left (by right or left clicking) in a plane facing the user.

In this case, on the basis of information related to a tilt of the main body 1 (acceleration) obtained by the acceleration sensor 115, the CPU 101 calculates a change in tilt of the main body 1. Then, on the basis of the calculated change, the CPU 101 determines a direction of rotation of the information processing apparatus 100 and performs a page turning operation on the display screen 10 in a direction corresponding to the determined direction of rotation. For example, when the user rotates the information processing apparatus 100 to the right, the CPU 101 displays an image on the next page, and when the user rotates the information processing apparatus 100 to the left, the CPU 101 displays an image on the previous page.

(Rotating Operation for Rotating Displayed Image)

A rotating operation for rotating a displayed image 20 in the information processing apparatus 100 of the present embodiment is performed in the following manner. First, assume that the user holds the information processing apparatus 100 in landscape position as illustrated in FIG. 3. In landscape position, the up-and-down direction of the displayed image 20 (a flower image in the example of FIG. 3) displayed on the display screen 10 coincides with the direction of short sides of the display screen 10.

Figure 4:
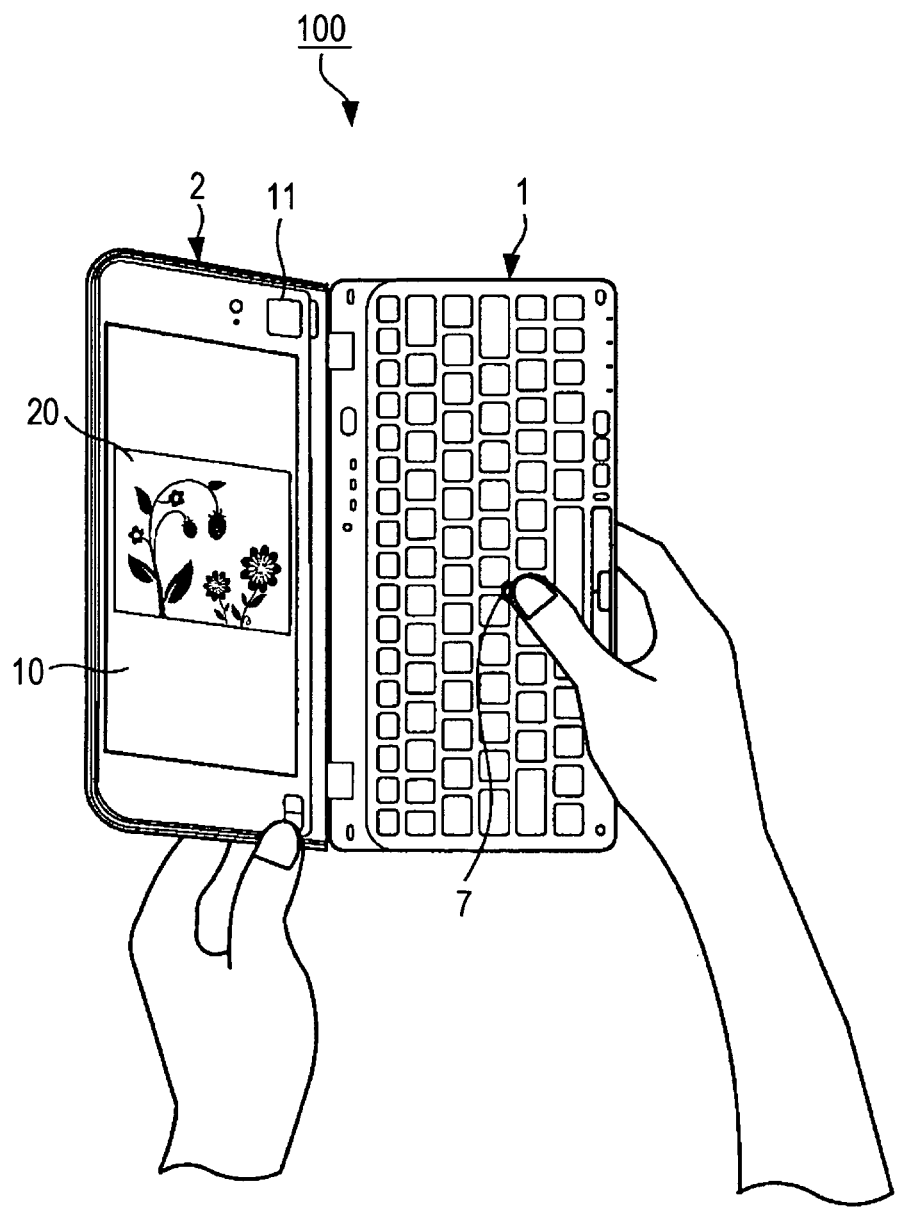
FIG. 4 is a diagram for explaining various operations performed on the information processing apparatus.

Next, assume that the user rotates the information processing apparatus 100 by 90 degrees in a plane facing the user. FIG. 4 illustrates the information processing apparatus 100 rotated by 90 degrees from FIG. 3 (hereinafter, this position of the information processing apparatus 100 will be referred to as "portrait position"). On the basis of a detection signal obtained by the acceleration sensor 115, the CPU 101 determines that the information processing apparatus 100 has been rotated by 90 degrees. Then, the CPU 101 rotates the displayed image 20 by 90 degrees in the same direction as the rotation of the information processing apparatus 100 and displays the rotated displayed image 20. Thus, when the information processing apparatus 100 is rotated to portrait position, the displayed image 20 is rotated by 90 degrees such that its up-and-down direction coincides with the longitudinal direction of the display screen 10.

The present embodiment is configured such that when the information processing apparatus 100 is rotated from landscape to portrait position, the direction of operation of the stick pointer 7 and that of the touch pad 11 are automatically rotated by 90 degrees.

3. Scrolling Operation on Information Processing Apparatus

Next, a description will be given of a scrolling operation that the user performs while holding the information processing apparatus 100 in hands. In the present embodiment, the aspect ratio of the display screen 10 is relatively small, as illustrated in FIG. 3. Therefore, a scrolling operation is performed mainly in the direction of short sides of the display screen 10 (in the up-and-down direction in FIG. 3). The present embodiment describes an example in which the display screen 10 is scrolled in the direction of its short sides.

In the information processing apparatus 100 of the present embodiment, when performing a scrolling operation while holding the information processing apparatus 100 in hands, the user can use the touch pad 11 of the display unit 2 or the acceleration sensor 115 mounted inside the main body 1.

(Method Using Touch Pad)

Figure 5:
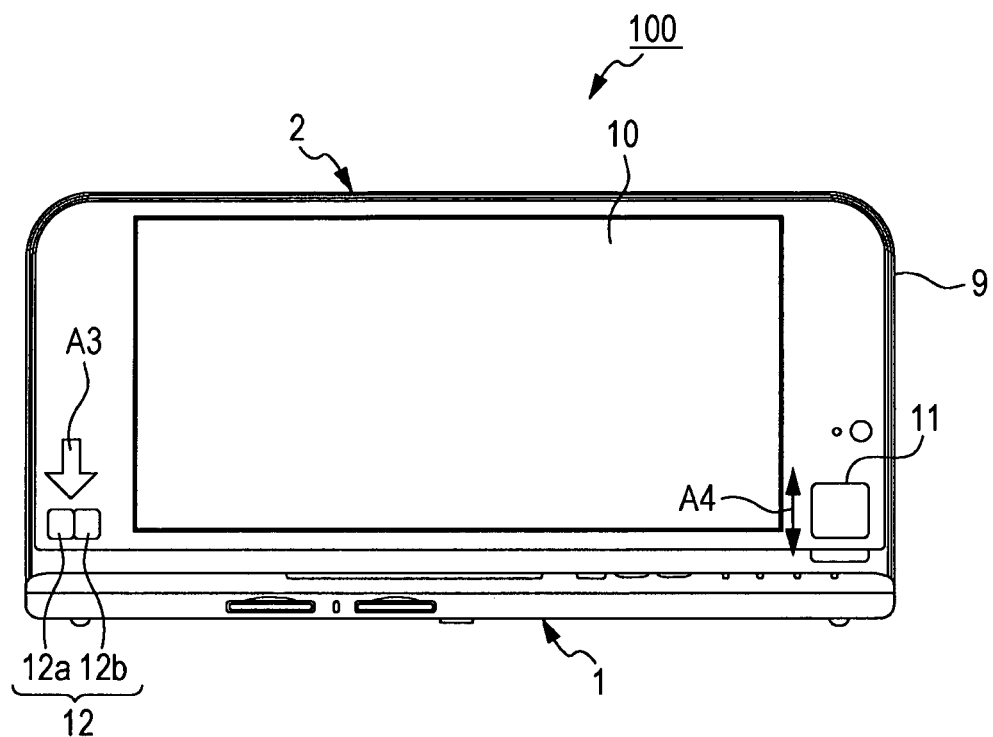
FIG. 5 is a diagram for explaining a scrolling operation using a touchpad on the information processing apparatus.

First, a procedure for performing a scrolling operation using the touch pad 11 will be described with reference to FIG. 5. FIG. 5 is a front view of the information processing apparatus 100 held in landscape position (see FIG. 3) by the user. To simplify the description, the user's both hands are omitted from the illustration of FIG. 5.

When performing a scrolling operation using the touch pad 11, the user first presses both the left click button 12a and the right click button 12b of the second click button 12, for example, with the left thumb (see arrow A3 in FIG. 5). This brings the operation mode of the information processing apparatus 100 into a scrolling operation mode.

Next, while holding down the second click button 12, the user moves, for example, the right thumb on the touch pad in one or the other direction (upward or downward in FIG. 5) along the direction of short sides of the display screen 10, as indicated by arrow A4 in FIG. 5.

The touch pad 11 detects a signal corresponding to the direction and amount of movement of the finger. The CPU 101 controls the display screen 10 on the basis of the detected signal, and scrolls the display screen 10 by a predetermined amount in the direction of short sides of the display screen 10 corresponding to the detected signal.

A scrolling operation using the touch pad 11 is performed in the manner described above. The present embodiment is configured such that once the scrolling operation mode is entered, it continues until the finger is released from the second click button 12. For example, after the scrolling operation mode is entered, even if the finger holding down the second click button 12 is displaced therefrom and one of the left click button 12a and the right click button 12b is released, the scrolling operation mode is not cancelled. This function works similarly in a scrolling operation using the acceleration sensor 115.

(Method Using Acceleration Sensor)

(1) Operation Overview

Figure 6:
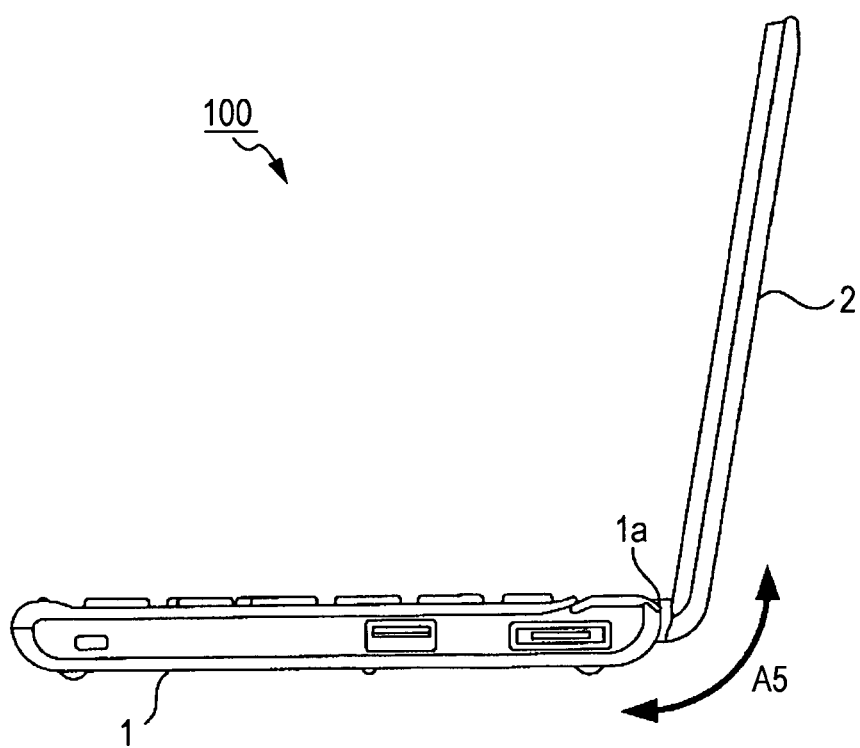
FIG. 6 is a diagram for explaining a scrolling operation using an acceleration sensor in the information processing apparatus.

Next, an overview of a scrolling operation performed using the acceleration sensor 115 will be described with reference to FIG. 6. FIG. 6 is a side view of the information processing apparatus 100 held in landscape position (see FIG. 3) by the user. To simplify the description, the user's both hands are omitted from the illustration of FIG. 6.

When performing a scrolling operation using the acceleration sensor 115, the user first presses both the left click button 12a and the right click button 12b of the second click button 12, for example, with the left thumb. Thus, the scrolling operation mode is entered.

Next, while holding down the second click button 12, the user rotates the information processing apparatus 100 in one or the other direction (see arrow A5 in FIG. 6) about the axis along which the long edge 1a of the main body 1 adjacent to the display unit 2 extends. The tilt of the main body 1 is thus changed. Then, the acceleration sensor 115 detects a signal corresponding to the direction and amount of change in tilt of the main body 1, and outputs the detected signal to the CPU 101. The CPU 101 controls the display screen 10 on the basis of the detected signal, and scrolls the display screen 10 by a predetermined amount in the direction of short sides of the display screen 10 corresponding to the detected signal.

A scrolling operation using the acceleration sensor 115 is performed in the manner described above. Again, as in the case of a scrolling operation using the touch pad 11, the scrolling operation mode continues until the finger is released from the second click button 12.

In the method using the acceleration sensor 115, the tilt of the main body 1 at the start of a scrolling operation (initial tilt) varies depending on how the user holds the information processing apparatus 100. In another embodiment, the initial tilt or reference position may be set automatically. Therefore, in the present embodiment, as will be described in detail below, the CPU 101 calculates the direction and amount of change in tilt of the main body 1 with respect to the initial tilt of the main body 1, and performs the scrolling operation on the basis of the calculated direction and amount of change.

(2) Processing Blocks

Figure 7:
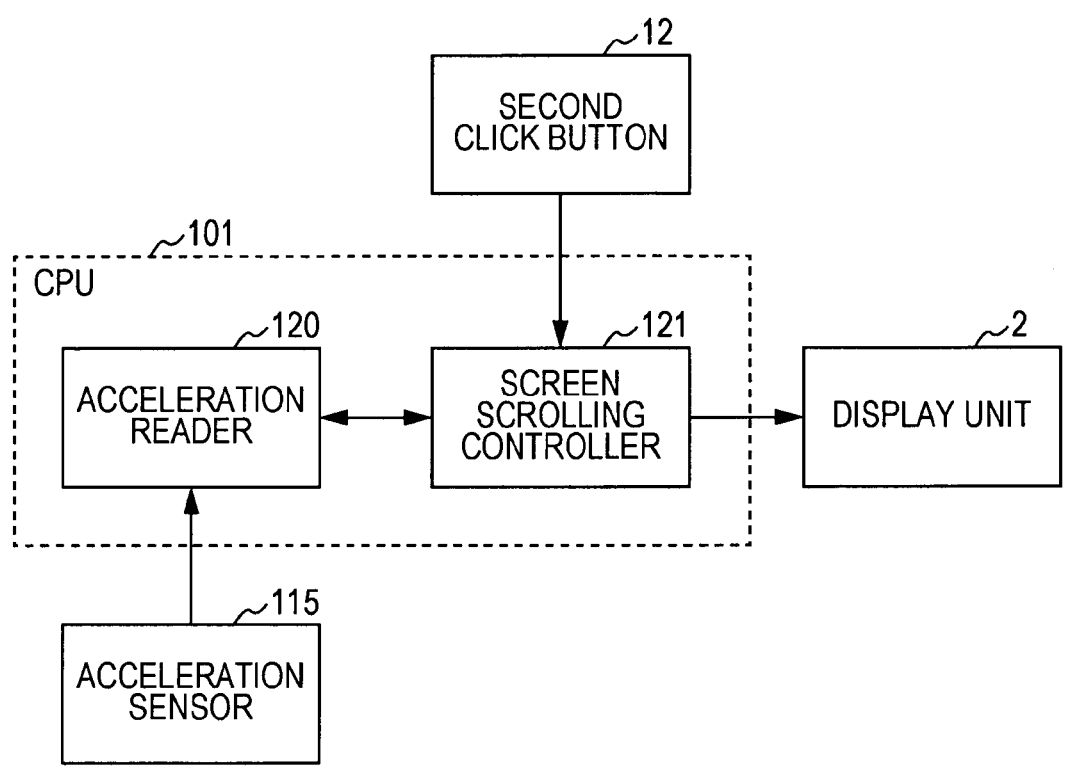
FIG. 7 illustrates a configuration of processing blocks for executing a scrolling operation using the acceleration sensor in the information processing apparatus.
Figure 8:
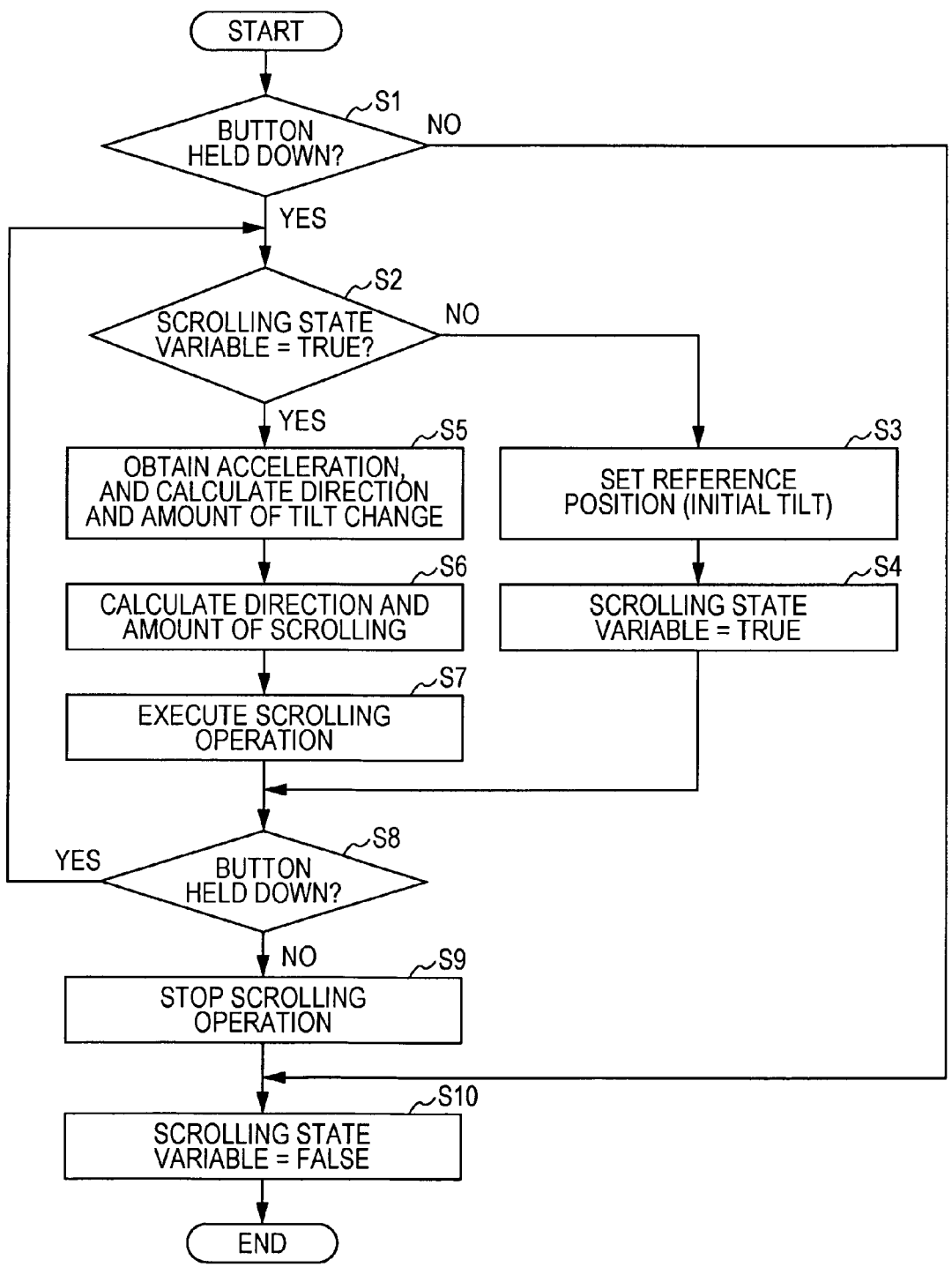
FIG. 8 is a flowchart illustrating a procedure for performing a scrolling operation using the acceleration sensor in the information processing apparatus.

A scrolling operation using the acceleration sensor 115 will now be described in detail with reference to FIG. 7 and FIG. 8. FIG. 7 is a block diagram of a processing system necessary for performing a scrolling operation using the acceleration sensor 115. Note that only a processing system necessary for a scrolling operation using the acceleration sensor 115 is illustrated in FIG. 7, and others are omitted from the illustration. FIG. 8 is a flowchart illustrating a procedure for performing a scrolling operation using the acceleration sensor 115.

As illustrated in FIG. 7, the CPU 101 includes an acceleration reader 120 and a screen scrolling controller 121 (scrolling operation controller) as processing units for performing a scrolling operation using the acceleration sensor 115.

The acceleration reader 120 is connected to the acceleration sensor 115 and obtains a signal detected by the acceleration sensor 115. The acceleration reader 120 outputs the detected signal obtained from the acceleration sensor 115 to the screen scrolling controller 121.

The screen scrolling controller 121 controls an overall scrolling operation. For example, the screen scrolling controller 121 determines the start and continuation of the scrolling operation mode, and calculates the direction and amount of scrolling in the scrolling operation. The screen scrolling controller 121 is connected, for example, to the second click button 12 and determines the start and continuation of the scrolling operation mode on the basis of an input signal from the second click button 12. Also, on the basis of a signal detected by the acceleration sensor 115 and input from the acceleration reader 120, the screen scrolling controller 121 calculates the direction and amount of scrolling of the display screen 10.

The direction of scrolling can be calculated from a gravitational acceleration component in each axis detected by the acceleration sensor 115. The amount of scrolling can be determined, for example, in the following manner. First, a speed is calculated by integrating gravitational acceleration detected by the acceleration sensor 115 with respect to a predetermined period of time. Then, a distance of movement of the main body 1 is calculated by integrating the calculated speed with respect to a predetermined period of time. Then, the amount of scrolling is determined on the basis of the calculated distance of movement of the main body 1. Note in the present embodiment that the distance of movement is calculated with respect to the start (initial state) of the scrolling operation. As noted above, the initial tilt or reference position may be set automatically. Such automatic setting may be performed by a software program (such as an application), without additional input by the user, based on the detected context. Such detected context may pertain to a number of predetermined parameters, such as time, place, device status and so forth. Then, for example, a correspondence between the calculated distance of movement and the amount of scrolling is stored as data, in advance, in the ROM 102 or the storage device 110. The screen scrolling controller 121 determines the amount of scrolling with reference to the data stored.

(3) Operation Procedure

With reference to FIG. 8, a procedure for performing a scrolling operation using the acceleration sensor 115 will be described in detail. The present embodiment describes an example in which a scrolling operation is controlled using a variable for determining whether the operation condition is in a scrolling state (hereinafter referred to as a scrolling state variable). In the following description, the scrolling state variable is set to "TRUE" when the operation condition is in a scrolling state, while the scrolling state variable is set to "FALSE" when the operation condition is not in a scrolling state. Note that the scrolling state variable is "FALSE" at the start (initial state) of a scrolling operation.

First, the information processing apparatus 100 is held in landscape position by the user. Next, on the basis of an output signal from the second click button 12, the screen scrolling controller 121 determines whether both the left click button 12a and the right click button 12b are held down (step S1). Specifically, for example, the screen scrolling controller 121 determines whether held-down signals are output from both the left click button 12a and the right click button 12b.

If held-down signals are not output from both the left click button 12a and the right click button 12b (NO in step S1), the screen scrolling controller 121 sets the scrolling state variable to "FALSE" (step S10) and ends the scrolling process.

On the other hand, if held-down signals are output from both the left click button 12a and the right click button 12b (YES in step S1), the screen scrolling controller 121 starts the scrolling operation mode and determines whether the scrolling state variable is "TRUE" (step S2).

A processing procedure from step S2 carried out at the start of the scrolling operation will now be described. As described above, the scrolling state variable is "FALSE" at the start of the scrolling operation (NO in step S2). In this case, on the basis of a detection signal from the acceleration sensor 115, the screen scrolling controller 121 calculates a tilt (initial tilt) of the main body 1 and sets the calculated tilt as a reference position (step S3). Next, the screen scrolling controller 121 sets the scrolling state variable to "TRUE" (step S4). Step S4 may be performed before step S3.

Next, the screen scrolling controller 121 determines whether the second click button 12 is held down (step S8). In step S8, a determination is made as to whether the scrolling state continues. Therefore, the screen scrolling controller 121 determines whether a held-down signal is output from at least one of the left click button 12a and the right click button 12b.

If held-down signals are not output from both the left click button 12a and the right click button 12b (NO in step S8), the screen scrolling controller 121 stops the scrolling operation (step S9), sets the scrolling state variable to "FALSE" (step S10), and ends the scrolling process.

On the other hand, if a held-down signal is output from at least one of the left click button 12a and the right click button 12b (YES in step S8), the screen scrolling controller 121 determines that the scrolling state continues. The screen scrolling controller 121 then returns to step S2.

Next, a processing procedure from step S2 carried out after the scrolling operation mode is entered and a reference position of the main body 1 is set (in step S3) will be described.

First, the screen scrolling controller 121 determines whether the scrolling state variable is "TRUE" (step S2). After the scrolling operation mode is entered and a reference position of the main body 1 is set, the scrolling state variable is "TRUE" (YES in step S2).

In this case, the screen scrolling controller 121 obtains a detection signal (gravitational acceleration) from the acceleration sensor 115 and calculates the tilt of the main body 1. On the basis of the calculated tilt, the screen scrolling controller 121 calculates the direction and amount of change in tilt of the main body 1 from the reference position set in step S3 (step S5). Next, on the basis of the calculated direction and amount of change in tilt of the main body 1, the screen scrolling controller 121 calculates the direction and amount of scrolling of the display screen 10 (step S6).

Next, the screen scrolling controller 121 controls the display unit 2 on the basis of the calculated direction and amount of scrolling of the display screen 10, and scrolls the display screen 10 in a predetermined direction by a predetermined amount (step S7). Then, the screen scrolling controller 121 determines whether the second click button 12 is held down (step S8).

If a held-down signal is output from at least one of the left click button 12a and the right click button 12b (YES in step S8), the screen scrolling controller 121 determines that the scrolling state continues. Then, the screen scrolling controller 121 repeats step S2 to step S7 described above.

On the other hand, if held-down signals are not output from both the left click button 12a and the right click button 12b (NO in step S8), the screen scrolling controller 121 stops the scrolling operation (step S9), sets the scrolling state variable to "FALSE" (step S10), and ends the scrolling process. In the present embodiment, a scrolling operation using the acceleration sensor 115 is performed in the manner described above.

As described above, in the information processing apparatus 100 of the present embodiment, after the scrolling operation mode is entered, information related to the tilt of the main body 1 of the information processing apparatus 100 is detected by the acceleration sensor 115, and the corresponding scrolling operation is performed on the basis of the detected information. That is, in the present embodiment, once the scrolling operation mode is entered, a predetermined scrolling operation is made possible simply by tilting the information processing apparatus 100. Therefore, in the present embodiment, after the scrolling operation mode is entered, a scrolling operation can be performed without using operators, such as buttons and keys, and thus, improved usability can be achieved.

In the present embodiment, the direction and amount of scrolling of the display screen 10 are calculated with respect to an initial tilt of the main body 1 calculated at the start of a scrolling operation. Therefore, in the present embodiment, even if the way the user holds the information processing apparatus 100 at the start of the scrolling operation (i.e., the initial tilt of the information processing apparatus 100) is changed, the scrolling operation can be performed accurately.

In the embodiments describe above, when a scrolling operation is performed using the acceleration sensor 115, the second click button 12 is used as an operator for starting the scrolling operation mode. However, the present application is not limited to this. As an operator for starting the scrolling operation mode, the first click button 8 or a predetermined key on the keyboard 6 may be used. However, when the user performs a scrolling operation while holding the information processing apparatus 100 in landscape position as illustrated in FIG. 3, using the second click button 12 as an operator for starting the scrolling operation mode makes it easier to perform the scrolling operation.

In the embodiments describe above, the user holds down at least one of the left click button 12a and the right click button 12b as a way to continue the scrolling operation mode. However, the present application is not limited to this, and any method can be used. For example, a configuration may be made such that once the scrolling operation mode is entered by holding down the left click button 12a and the right click button 12b for a predetermined period of time, the scrolling operation mode can continue even if the finger is released from the second click button 12. Alternatively, if an operator for starting the scrolling operation mode is a single operation button, both the starting and continuation of the scrolling operation mode may be executed, for example, by double-clicking on the operation button.

In the embodiments describe above, the display screen 10 is scrolled in the direction of its short sides (vertical direction). However, the present application is not limited to this. In the present embodiment, since a three-axis acceleration sensor is used as the acceleration sensor 115, the display screen 10 can also be scrolled in its longitudinal direction (horizontal direction). In this case, for example, while holding down the second click button 12, the user may rotate the information processing apparatus 100 in a bottom plane of the main body 1 in one or the other direction. Then, the acceleration sensor 115 may detect the direction and amount of the rotation of the main body 1 so that the display screen 10 can be scrolled on the basis of the detected signal.

In the embodiments describe above, for determining the direction and amount of scrolling of the display screen 10, the acceleration sensor 115 detects information related to a tilt of the main body 1. However, the present application is not limited to this. If the acceleration sensor 115 is mounted on the display unit 2, the acceleration sensor 115 may detect information related to a tilt of the display unit 2 so that a scrolling operation can be performed on the basis of the detected information.

It should be understood by those skilled in the art that various modifications, combinations, sub-combinations and alterations may occur depending on design requirements and other factors insofar as they are within the scope of the appended claims or the equivalents thereof.

What is claimed is:

1. A computer device comprising:
a main unit having a main unit input device to enable a user to provide inputs regarding a scrolling operation, wherein the main unit input device includes a physical keyboard;
a display unit rotatably coupled to the main unit so as to be rotatable about an axis near an end of the main unit, said display unit having a housing, a display screen disposed on a surface of the housing, and a display unit input device to enable the user to provide inputs regarding the scrolling operation, wherein the display unit input device includes a button type mechanism and a touch pad which are disposed on the surface of the housing having the display screen at respective opposite lower corners thereof such that one of the button type mechanism or the touch pad is located at a lower-right corner of the housing and the other of the button type mechanism or the touch pad is located at a lower-left corner of the housing, wherein the button type mechanism and the touch pad are physical mechanisms placed beside the display screen; and
a processor configured to perform processing for the scrolling operation,
wherein the scrolling operation is performed by the processor by allowing the user a first choice to use the main unit input device or the display unit input device, and when performed by the display unit input device the scrolling operation is initiated by pressing the button type mechanism and thereafter is controllable by allowing the user a second choice to use the touch pad or to change a tilt position of the computer device from a reference tilt position, such that when desired to perform the scrolling operation the user presses the button type mechanism to initiate the scrolling operation and while depressing the button type mechanism either (i) provides an input movement to the touch pad to cause a desired amount or direction of scrolling or (ii) tilts the computer device from the reference position to cause the desired amount or the direction of scrolling without use of the touch pad.

2. The computer device of claim 1, in which the button type mechanism includes a first button and a second button, and in which when performed by the display unit input device the scrolling operation is initiated by pressing both the first button and the second button.

3. The computer device of claim 1, in which the display unit input device enables the user to set the reference tilt position.

4. The computer device of claim 1, in which the reference tilt position is automatically set without additional input by the user.

5. The computer device of claim 1, in which during the second available technique the scrolling operation is continuously executed while the tilt position of the computer device changes from the reference tilt position to a current tilt position.

6. The computer device of claim 5, in which the scrolling operation changes an image displayed in the display screen in a first direction by a first amount related to a first change in tilt position about a first axis of the computer device.

7. The computer device of claim 6, in which the scrolling operation further changes the image in a second direction by a second amount related to a second change in tilt position about a second axis of the computer device, the second axis being perpendicular to the first axis.

8. The computer device of claim 1, further comprising a sensor for producing information indicative of the change in tilt position.

9. The computer device of claim 8, in which the information indicative of the change in tilt position is representative of a rotation about one or more axes of the computer device and direction thereof.

10. The computer device of claim 9, in which the sensor is an accelerator type sensor for detecting acceleration about one or more axes.

11. The computer device of claim 1, in which the computer device is a portable computer device intended to be carried by a user.

* * * * *